(12) United States Patent
Mahurin et al.

(10) Patent No.: US 6,539,470 B1
(45) Date of Patent: Mar. 25, 2003

(54) INSTRUCTION DECODE UNIT PRODUCING INSTRUCTION OPERAND INFORMATION IN THE ORDER IN WHICH THE OPERANDS ARE IDENTIFIED, AND SYSTEMS INCLUDING SAME

(75) Inventors: Eric W. Mahurin, Austin, TX (US); Brian D. McMinn, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/441,632

(22) Filed: Nov. 16, 1999

(51) Int. Cl.$^7$ .............. G06F 9/30; G06F 9/34; G06F 9/355
(52) U.S. Cl. ............. 712/208; 712/213; 712/227; 712/210; 711/214; 711/220; 711/212
(58) Field of Search .............. 712/214, 210, 712/208, 27, 207, 213, 209, 211, 212, 242, 243, 227, 245; 711/213, 214, 220, 212, 123, 125

(56) References Cited

U.S. PATENT DOCUMENTS

| | | | |
|---|---|---|---|
| 5,109,495 A | * 4/1992 | Fite et al | 712/207 |
| 5,487,156 A | * 1/1996 | Popescu et al. | 712/217 |
| 5,796,973 A | 8/1998 | Witt et al. | 712/208 |
| 5,898,851 A | 4/1999 | Narayan et al. | 712/210 |
| 5,918,031 A | 6/1999 | Morrison et al. | 712/208 |
| 5,940,602 A | 8/1999 | Narayan et al. | 712/213 |
| 6,336,178 B1 | 1/2002 | Favor | 712/213 |

* cited by examiner

Primary Examiner—Daniel H. Pan
(74) Attorney, Agent, or Firm—Lawrence J. Merkel

(57) ABSTRACT

An instruction decode unit is described including circuitry coupled to receive an instruction. The instruction identifies multiple operands, one of which is a destination operand. The circuitry responds to the instruction by producing: (i) operand codes specifying the operands, wherein the operand codes are produced in the order in which the operands are identified within the instruction, and (ii) a destination operand signal identifying the destination operand. In one embodiment, the decode unit responds to the instruction by producing the operand codes, operand address information, control signals, and the destination operand signal. A processor including the instruction decode unit is also described, as is a computer system including the processor. The instruction may include operand information which identifies the operands. The instruction may also include destination operand information which indicates which of the operands is the destination operand. The circuitry may produce the destination operand signal dependent upon the destination operand information. The instruction may be a member of an instruction set including instructions having a variable number of bytes. In one particular example, the instruction may be an x86 instruction including operand information which identifies two operands. The instruction may include a direction bit, and the value of the direction bit may indicate which of the two operands is the destination operand. In this case, the circuitry may produce the destination operand signal dependent upon the value of the direction bit.

21 Claims, 6 Drawing Sheets

INSTRUCTION DECODE UNIT PRODUCING INSTRUCTION OPERAND INFORMATION IN THE ORDER IN WHICH THE OPERANDS ARE IDENTIFIED, AND SYSTEMS INCLUDING SAME

BACKGROUND OF THE INVENTION

1. Field of the Invention

The invention relates to the field of computers, and more particularly to processors executing machine coded instructions which specify operands.

2. Description of the Relevant Art

The vast amount of software developed for 80×86 (x86) processors (i.e., 8086/8, 80286, 80386, 80486, and Pentium processors) makes it highly advantageous for processor manufacturers to produce products which execute x86 instructions, thereby maintaining "backwards compatability" with existing x86 software. Maintaining software compatibility is often achieved by simply modifying or extending existing hardware in order to add new features and/or increase performance.

The x86 instruction set is relatively complex and is characterized by variable byte length instructions. FIG. 1 is a diagram of a generic x86 instruction 10. As shown in FIG. 1, x86 instruction 10 includes an optional prefix field 12, an operation code (opcode) field 14, an optional addressing mode (MODR/M) byte 16, an optional scale-index-base (SIB) byte 18, an optional displacement field 20, and an optional immediate field 22. Optional prefix field 12 includes one to five 8-bit prefix bytes. Opcode field 14 follows prefix field 12, and includes one or two opcode bytes. Opcode field 14 defines the operation performed by instruction 10. Prefix bytes within prefix field 12 may modify the operation of instruction 10 defined by opcode field 14. For example, a prefix byte within prefix field 12 may change the address or operand size for instruction 10, override the default segment used in memory addressing, or instruct the processor to repeat a string operation a number of times.

Optional MODR/M byte 16 follows opcode field 14, and includes information specifying operand types, registers used during execution of instruction 10, and memory addressing modes. FIG. 2 is a diagram of optional MODR/M byte 16 of x86 instruction of FIG. 1. Optional MODR/M byte 16 includes a mode (MOD) field 24, a register/operation (REG/OP) field 26, and a register/memory (R/M) field 28. MOD field 24 includes bits 7 and 6 of MODR/M byte 16. The two bits of MOD field 24 determine how RIM field 28 and optional displacement field 20 are interpreted. REG/OP field 26 includes bits 5, 4, and 3 of MODR/M byte 16. The three bits of REG/OP field 26 are used either to: (i) specify a register operand, or (ii) hold additional bits of opcode field 14. R/M field 28 includes bits 2, 1, and 0 of MODR/M byte 16. The three bits of R/M field 28 specify either a register source operand (MOD='11') or a memory reference (MOD ≠'11').

Optional SIB byte 18 follows optional MODR/M byte 16, and is used only in 32-bit base-relative addressing using scale and index factors. FIG SIB byte 18 of x86 instruction 10 of FIG. 1. SIB byte 18 includes a scale field 30, an index field 32, and a base field 34. Base field 34 includes bits 2–0 of SIB byte 18, and specifies which register contains the base value for the address calculation. Index field 32 includes bits 5–3 of SIB byte 18, and specifies which register contains the index value. Scale field 30 includes bits 7–6 of SIB byte 18, and specifies the power of two by which the index value will be multiplied before being added, along with any displacement, to the base value.

Optional displacement field 20 follows SIB byte 18, and includes one to four bytes of displacement data. The displacement data forms a constant used in address calculations. Optional immediate field 22 follows optional displacement field 20, and includes one to four bytes of a constant used as an instruction operand.

Each instruction of the x86 instruction set defines an operation carried out using 0, 1, or 2 operands. For example, a first subset of the x86 instruction set includes instructions consisting of a single opcode byte and having no operands (e.g., NOP and HLT). A second subset of the x86 instruction set includes instructions having a single operand which functions as both a source operand and a destination operand (e.g., INC and DEC). The single operand may be a value stored in a register or a memory location. When the single operand is a register value, the register is specified by the encoding of the 3 least significant bits of a single opcode byte within opcode field 14. When the single operand is a value stored within a memory location, the memory location is specified by values encoded within MODR/M byte 16 and displacement data within displacement field 20.

A third subset of the x86 instruction set includes instructions having two operands: a source operand and a destination operand (e.g., ADD and SUB). The source and destination operands are involved in the operation, and a result of the operation is stored in the destination operand and used to set flag bits within a flag register. The source and destination operands may be registers or memory locations specified by the encoding of the opcode byte within opcode field 14, values encoded within MODR/M byte 16, and displacement data within displacement field 20. Alternately, the source operand may be a constant value specified by immediate data within immediate field 22.

FIG. 4 is a diagram of an exemplary last opcode byte 36 within opcode field 14 of x86 instruction 10 of FIG. 1. Bit 1 of last opcode byte 36 may be a direction (D) bit or a sign (S) bit. The direction bit determines whether the register specified in REG/OP field 26 of MODR/M field 16 is a source operand or a destination operand of x86 instruction 10. If D=0, REG/OP field 26 specifies a register which is the source operand. On the other hand, if D=1, the destination operand is a register specified by REG/OP field 26, and the source operand may be a memory operand or another register operand. When bit 1 of last opcode byte 36 is a sign bit and S=1, the immediate data within immediate field 22 is sign extended to full operand length before use. If S=0, the immediate data is not modified. It is noted that the direction and/or sign bits may be located at any bit positions within any opcode byte of x86 instruction 10.

Bit 0 of last opcode byte 36 may be a width (W) bit. The width bit determines whether the operands are treated as 8-bit, 16-bit, or 32-bit quantities. If W=0, both the source and destination operands are treated as 8-bit quantities. If W=1, operand size is determined by the current operating mode of the processor. For example, if the processor is operating in a 16-bit mode and W=1, both operands will be treated as 16-bit quantities. On the other hand, if the processor is operating in a 32-bit mode and W=1, both operands will be treated as 32-bit quantities. In accordance with the above, REG/OP field 26 of MODR/M field 16 specifies either an 8-bit, a 16-bit, or a 32-bit register dependent upon the value of the width bit and the current operating mode of the processor. It is noted that the width bit may be located at any bit position within any opcode byte of x86 instruction 10.

A typical processor includes an instruction decoder which receives and decodes instructions, to include operand information, and a "functional unit" which receives the decoded instructions and operand information from the instruction decoder and executes the decoded instructions. In order to produce a result which corresponds to a destination operand, the functional unit may require that a source operand always be provided at one input and the destination operand always be provided at another input. As the source operand may be specified before or after the destination operand within x86 instructions, the decoder may require additional hardware to reorder the source and destination operands if necessary before providing the operands to the functional unit.

It would thus be advantageous to have an instruction decoder which produces operand information in the order in which the operands are identified within the instruction. Such an instruction decoder would eliminate any need for additional hardware to reorder source and destination operands delivered to the functional unit.

SUMMARY OF THE INVENTION

An instruction decode unit is described including circuitry coupled to receive an instruction. The instruction identifies multiple operands, one of which is a destination operand. The circuitry responds to the instruction by producing: (i) operand codes specifying the operands, wherein the operand codes are produced in the order in which the operands are identified within the instruction, and (ii) a destination operand signal identifying the destination operand. In one embodiment, the decode unit responds to the instruction by producing the operand codes, operand address information, control signals, and the destination operand signal. A processor including the instruction decode unit is also described, as is a computer system including the processor.

The instruction may include operand information which identifies the operands. The instruction may also include destination operand information which indicates which of the operands is the destination operand. The circuitry may produce the destination operand signal dependent upon the destination operand information. The instruction may be a member of an instruction set including instructions having a variable number of bytes. In one particular example, the instruction may be an x86 instruction including operand information which identifies two operands. The instruction may include a direction bit, and the value of the direction bit may indicate which of the two operands is the destination operand. In this case, the circuitry may produce the destination operand signal dependent upon the value of the direction bit.

In addition to the decode unit, the processor may include a reservation station, a functional unit, and a reorder buffer. The reservation station, the functional unit, and the reorder buffer may be coupled to a result bus. The decode unit may provide the operand codes and the destination operand signal to the reorder buffer. In response to the operand codes, the reorder buffer may produce either operand values or tags associated with the operand values. The reorder buffer may also produce a result tag associated with the instruction. If the destination operand is a register, the result tag may be associated with a storage location within the reorder buffer and reserved for the result. If the destination operand is a memory location, the reorder buffer may forward a copy of the result tag to a load/store unit coupled to the result bus and a memory.

The reservation station may receive and store the operand values/tags and the result tag from the reorder buffer, and the operand address information, the control signals, and the destination operand signal from the decode unit. The reservation station may continuously monitor the result bus. If a tag driven upon the result bus matches an operand tag stored within the reservation station, the reservation station may replace the operand tag with the corresponding value driven upon the result bus. The reservation station may dispatch operands, control signals, the result tag, and the destination operand signal of a given instruction to the functional unit only when all operand tags associated with the instruction have been replaced with operand values.

The functional unit may receive the operand values, control signals, the result tag, and the destination operand signal from the reservation station. The functional unit may perform an arithmetic/logic operation using the operands and dependent upon the control signals and the destination operand signal. The functional unit may produce a result via the arithmetic/logic operation, and may drive the result value and the result tag upon the result bus.

When one of the operands is a memory operand, the functional unit may receive the operand address information, the control signals, and the operand tag from the reservation station. The functional unit may perform an address calculation upon the operand address information dependent upon the control signals, and provide the resulting address information and operand tag to the load/store unit.

The computer system may include the above processor, a bus coupled to the processor, and a peripheral device coupled to the bus. The bus may be a peripheral component interconnect (PCI) bus, and the peripheral device may be, for example, a network interface card, a video accelerator, an audio card, a hard disk drive, or a floppy disk drive. Alternately, the bus may be an extended industry standard architecture (EISA)/industry standard architecture (ISA) bus, and the peripheral device may be, for example, a modem, a sound card, or a data acquisition card.

BRIEF DESCRIPTION OF THE DRAWINGS

Other objects and advantages of the invention will become apparent upon reading the following detailed description and upon reference to the accompanying drawings in which.

Figure 1:
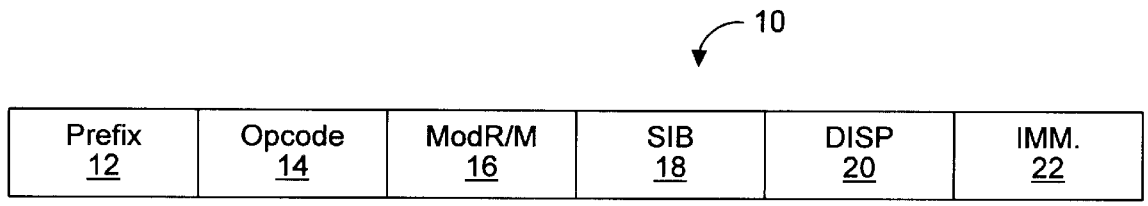
FIG. 1 is a diagram of a generic x86 instruction, wherein the generic x86 instruction includes an opcode field, an optional MODR/M byte, and an optional SIB byte.
Figure 2:
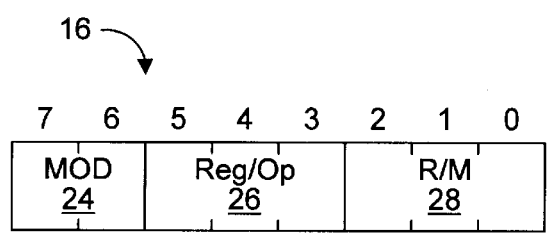
FIG. 2 is a diagram of the optional MODR/M byte of the generic x86 instruction of FIG. 1.
Figure 3:
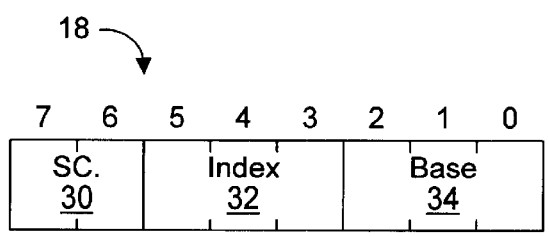
FIG. 3 is a diagram of the optional SIB byte of the generic x86 instruction of FIG. 1.
Figure 4:
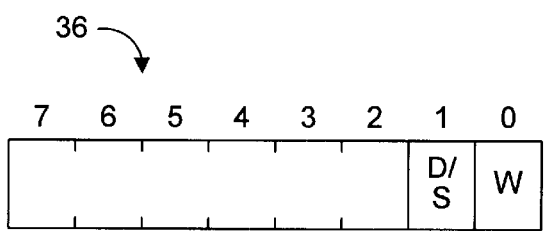
FIG. 4 is a diagram of an exemplary last opcode byte within the opcode field of the generic x86 instruction of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Figure 5:
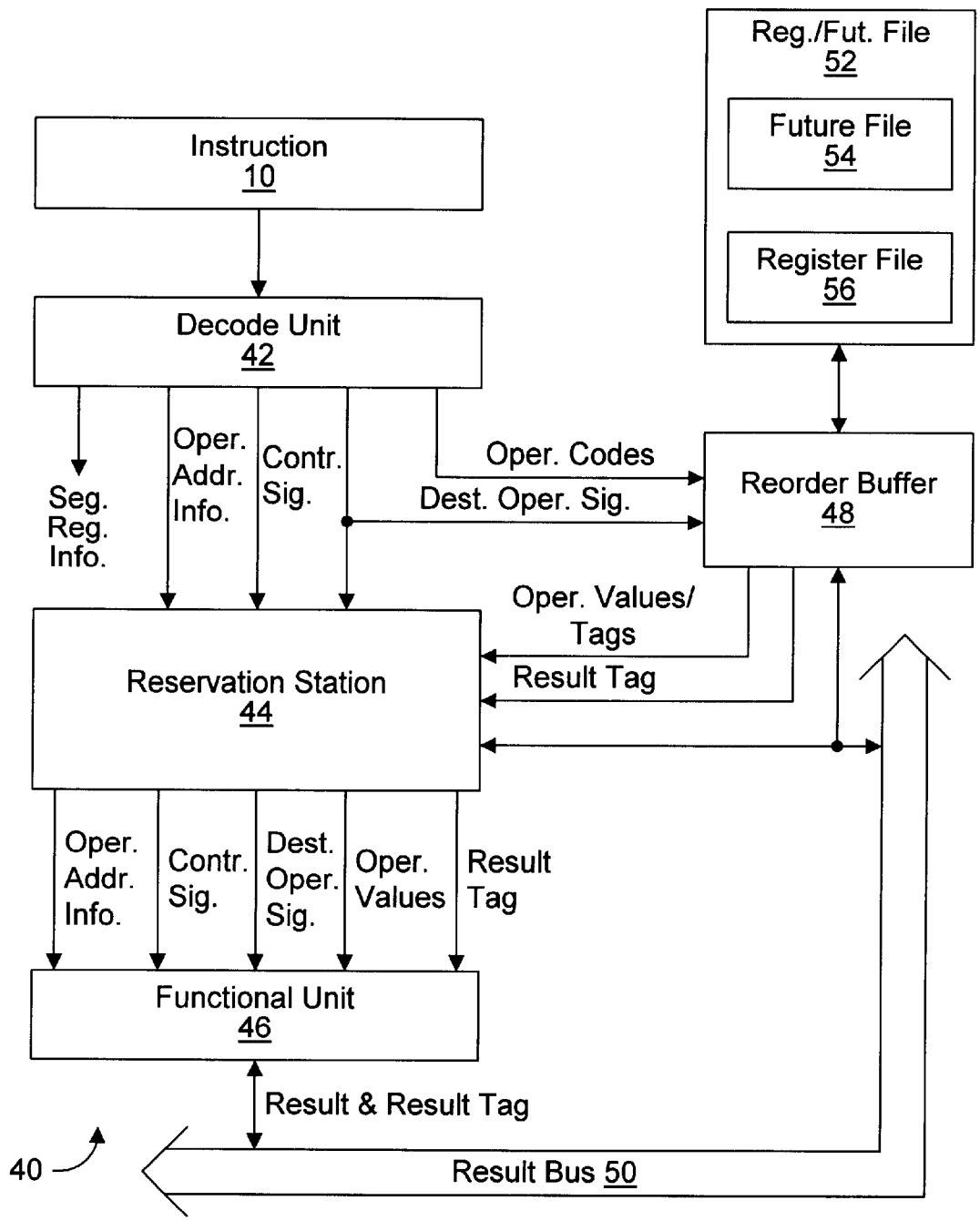
FIG. 5 is a diagram of one embodiment of an instruction decode/execution system including a decode unit, a reservation station, and a functional unit.

FIG. 5 is a diagram of one embodiment of an instruction decode/execution system 40 including a decode unit 42, a reservation station 44, and a functional unit 46. Decode unit 42 receives x86 instruction 10, and produces operand codes specifying the operands, memory operand address information, control signals, and a destination operand signal in response to x86 instruction 10. Decode unit 42 produces the operand codes in the order in which the operands are identified within x86 instruction 10. The destination operand signal indicates which of the operand codes specifies a destination operand. Decode unit 42 provides the operand codes and the destination operand signal to a reorder buffer 48. As will be described in more detail below, reorder buffer 48 responds to the operand codes by providing either the value of each operand or a tag for each operand. Reorder buffer 48 also produces a result tag associated with x86 instruction 10.

Reservation station 44 receives the memory operand address information, the control signals, and the destination operand signal from decode unit 42. Reservation station 44 also receives the operand values/tags and the result tag from reorder buffer 48. Reservation station 44 stores the operand values/tags, the memory operand address information, the control signals, the destination operand signal, and the result tag.

Functional unit 46 receives operand values, control signals, the destination operand signal, and the result tag corresponding to an instruction from reservation station 44. Functional unit 46 performs a first operation (e.g., an arithmetic or logic operation specified by x86 instruction 10) using the operands according to the control signals and dependent upon the destination operand signal. Functional unit 46 is coupled to a result bus 50. Functional unit 46 produces a result via the first operation, and drives the value of the result and the result tag upon result bus 50.

When one of the operands is a memory operand, functional unit 46 receives the memory operand address information, the operand tag of the memory operand, and control signals from reservation station 44. Functional unit 46 performs a second operation (e.g., an address calculation) upon the memory operand address information according to the control signals, and provides the resulting memory operand address information and the operand tag directly to a load/store unit coupled to result bus 50 and a memory. (See FIG. 8.) The load/store unit may complete the operand address calculation by adding the memory operand address information to the contents of a segment register specified by segment register information produced by decode unit 42. (See FIG. 5). The load/store unit may obtain the operand value from the memory using the calculated address, and drive the operand value and the operand tag upon result bus 50 such that the operand value is made available to reservation station 44. Reservation station 44 may recognize the operand tag as matching a stored operand tag, and may replace the operand tag with the corresponding operand value driven upon result bus 50.

Reservation station 44 is also coupled to result bus 50, and may continuously monitor result bus 50. If a tag driven upon result bus 50 matches an operand tag stored within reservation station 44, reservation station 44 may replace the operand tag with the corresponding value driven upon result bus 50. Reservation station 44 dispatches operands, control signals, and the destination operand signal of a given instruction to functional unit 46 only when all operand tags associated with the instruction have been replaced with operand values.

Reorder buffer 48 is coupled to a register/future file 52. Register/future file 52 includes a future file 54 and a register file 56. The x86 register file includes eight 32-bit real registers EAX, EBX, ECX, EDX, EBP, ESI, EDI, ESP, and sub-registers thereof. Future file 54 is used to store speculative register states, and register file 56 is used to store non-speculative register states. In response to the operand codes from decode unit 42, reorder buffer 48 may access future file 54 to obtain values for register operands. If a register operand value is available within future file 54, future file 54 may return the register operand value to reorder buffer 48. On the other hand, if the register operand value is not available within future file 54, future file 54 may return a tag corresponding to the register operand value to reorder buffer 48. Reorder buffer 48 provides either an operand value or a corresponding operand tag for each register operand to reservation station 44.

If any of the multiple operands is a memory operand, reorder buffer 48 may provide an operand tag for the memory operand to reservation station 44, and may also forward a copy of the operand tag to the load/store unit. As described above, functional unit 46 may forward produced memory operand address information and the corresponding operand tag directly to the load/store unit. The load/store unit may complete the operand address calculation, obtain the operand value from the memory using the calculated address, and drive the operand value and the operand tag upon result bus 50 such that the operand value is made available to reservation station 44. Reservation station 44 may recognize the operand tag as matching a stored operand tag, and may replace the operand tag with the corresponding operand value driven upon result bus 50.

As described above, reorder buffer 48 produces a result tag associated with x86 instruction 10. If the operand code identified by the destination operand signal specifies a register operand, reorder buffer 48 may provide a result tag correspond to a storage location within reorder buffer 48 allocated to the destination register. Reorder buffer 48 may also store the result tag in the storage location within future file 54 allocated to the destination register. Reorder buffer 48 provides the result tag to reservation station 44 along with operand values/tags for the multiple operands. Reorder buffer 48 may continuously monitor result bus 50. When functional unit 46 produces the result and drives the result value and the result tag upon result bus 50, reorder buffer 48 may recognize the matching tags and store the result value within the storage location allocated to the destination register within future file 54.

If the destination operand is a memory location, reorder buffer 94 may forward a copy of the result tag received to the load/store unit. The load/store unit may store the result tag and continuously monitor result bus 50. When functional unit 46 produces the result and drives the result value and the result tag upon result bus 50, the load/store unit may recognize the matching tags and store the result value within the memory.

Instruction decode/execution system 40 may be one of several instruction decode/execution systems coupled to a single result bus 50 within a processor which executes instructions of a software program in an order which differs from the order in which the instructions appear in the software program. Each of the multiple decode units may simultaneously decode different program instructions and provide operands, operand address information, and control signals to corresponding reservation stations. The reservation stations may dispatch operands and control signals to corresponding functional units when all operand tags have been replaced with operand values.

Figure 6:
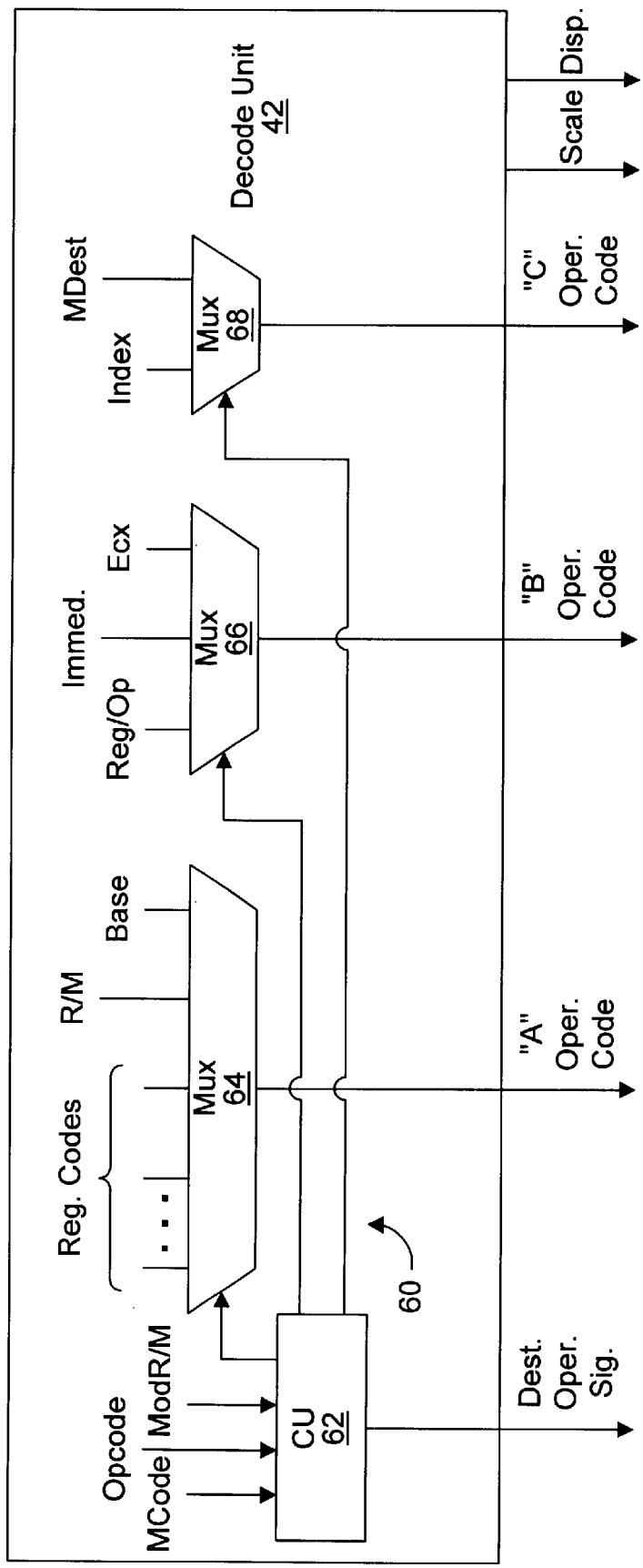
FIG. 6 is a diagram of one embodiment of the decode unit of FIG. 5.

FIG. 6 is a diagram of one embodiment of decode unit 42 of FIG. 5. In the embodiment of FIG. 6, decode unit 42 includes operand decode circuitry 60. Operand decode circuitry 60 includes a control unit (CU) 62 controlling three multiplexers 64, 66, and 68. Multiplexers 64, 66, and 68 respectively produce an "A" operand code, a "B" operand code, and a "C" operand code. Control unit 62 receives the contents of opcode field 14 and MODR/M byte 16 of x86 instruction 10 along with a microcode (MCODE) signal. A given x86 instruction may be replaced by multiple microcode instructions which accomplish the operation specified by the x86 instruction. Each microcode instruction may have two source operands followed by a destination operand. The MCODE signal may be asserted when the instruction is a microcode instruction.

Control unit 62 issues a first control signal to multiplexer 64 in response to the contents of opcode field 14 and MOD field 24 of MODR/M byte 16 of x86 instruction 10. Inputs to multiplexer 64 include register codes, the contents R/M field 28 of MODR/M byte 16, and base field 34 (BASE) of SIB byte 18 of x86 instruction 10. The x86 register file includes eight 32-bit real registers EAX, EBX, ECX, EDX, EBP, ESI, EDI, ESP, and sub-registers thereof. The register codes are preferably the same 3-bit codes used to specify a register in REG/OP field 26 of MODR/M byte 16 of x86 instruction 10 as indicated in Table 1 below:

TABLE 1

Preferred Register Codes.

| Code | W = 0, 16- and 32-Bit Modes: Register | W = 1, 16-Bit Mode: Register | W = 1, 32-Bit Mode: Register |
|---|---|---|---|
| 000 | AL | AX | EAX |
| 001 | CL | CX | ECX |
| 010 | DL | DX | EDX |
| 011 | BL | BX | EBX |
| 100 | AH | SP | ESP |
| 101 | CH | BP | EBP |
| 110 | DH | SI | ESI |
| 111 | BH | DI | EDI |

Multiplexer 64 selects from among the inputs including the register codes, the contents R/M field 28 of MODR/M byte 16, and the contents of base field 34 (BASE) of SIB byte 18 dependent upon the first control signal and produces the "A" operand code. Reorder buffer 48 receives the "A" operand code produced by multiplexer 64 and provides either the operand value, or an operand tag corresponding to the operand value, to reservation station 44 as the "A" operand.

Control unit 62 issues a second control signal to multiplexer 66 in response to the contents of opcode field 14 of x86 instruction 10. Inputs to multiplexer 66 include the contents of REG/OP field 26 of MODR/M byte 16, the contents of immediate field 22 (IMMED. ), and a code for the ECX register. The code for the ECX register is preferably 001' in accordance with Table 1 above.

Multiplexer 66 selects from among the inputs including the contents of REG/OP field 26 of MODR/M byte 16, the contents of immediate field 22 (IMD.), and the code for the ECX register dependent upon the second control signal and produces the "B" operand code. Reorder buffer 48 receives the "B" operand code produced by multiplexer 66 and provides either the operand value, or an operand tag corresponding to the operand value, to reservation station 44 as the "B" operand.

Control unit 62 issues a third control signal to multiplexer 68 in response to the contents of MODR/M byte 16 and the MCODE signal. As described above, the MCODE signal may be asserted when the instruction is one of several microcode instructions substituted for an x86 instruction. Inputs to multiplexer 68 include the contents of index field 32 (INDEX) of SIB byte 18 and a microcode destination (MDEST) which indicates a destination within a microcode sequence substituted for an x86 instruction.

Multiplexer 68 selects from among the inputs including the contents of index field 32 (INDEX) and the MDEST dependent upon the third control signal and produces the "C" operand code. For example, multiplexer 68 may produce the contents of index field 32 (INDEX) when the instruction is an x86 instruction and the contents of MODR/M byte 16 indicate that optional SIB byte 18 is present within the x86 instruction. Alternately, multiplexer 68 may produce the MDEST when the instruction is a microcode instruction. Reorder buffer 48 receives the "C" operand code produced by multiplexer 68. When the MCODE signal is not asserted, reorder buffer 48 provides either the operand value, or an operand tag corresponding to the operand value, to reservation station 44 as the "C" operand. On the other hand, when the MCODE signal is asserted, reorder buffer 48 may return the MDEST received from multiplexer 68 as the "C" operand.

Control unit 62 also produces the destination operand signal which indicates which of the three operand codes specifies the destination operand. Control unit 62 produces the destination operand signal in response to the contents of opcode field 14, MODR/M byte 16, and the MCODE signal. For example, when the instruction is an x86 instruction, the destination operand signal may indicate that either the "A" operand or the "B" operand is the destination operand dependent upon the direction bit within last opcode byte 36 of opcode field 14. On the other hand, when the instruction is a microcode instruction, the destination operand signal may indicate that the "C" operand (MDEST) is the destination operand.

When x86 instruction 10 employs 32-bit base-relative addressing, x86 instruction 10 includes SIB byte 18. Decode unit 42 produces the three operands such that the "A" operand code specifies which register contains the base value for the address calculation and the "C" operand code specifies which register contains the index value. Decode unit 42 also produces SCALE and DISPLACEMENT values. The SCALE value specifies the power of two by which the index value will be multiplied, and the DISPLACEMENT value indicates the displacement value used in the address calculation. The SCALE value is preferably conveyed using the same bit pattern of scale field 30 of SIB byte 18, and the DISPLACEMENT value is preferably conveyed using the same bit pattern of the displacement data bytes within displacement field 20. Alternately, the SCALE and DISPLACEMENT values may be conveyed using bit patterns derived from the respective bit patterns of scale field 30 and the displacement data bytes within displacement field 20.

Figure 7:
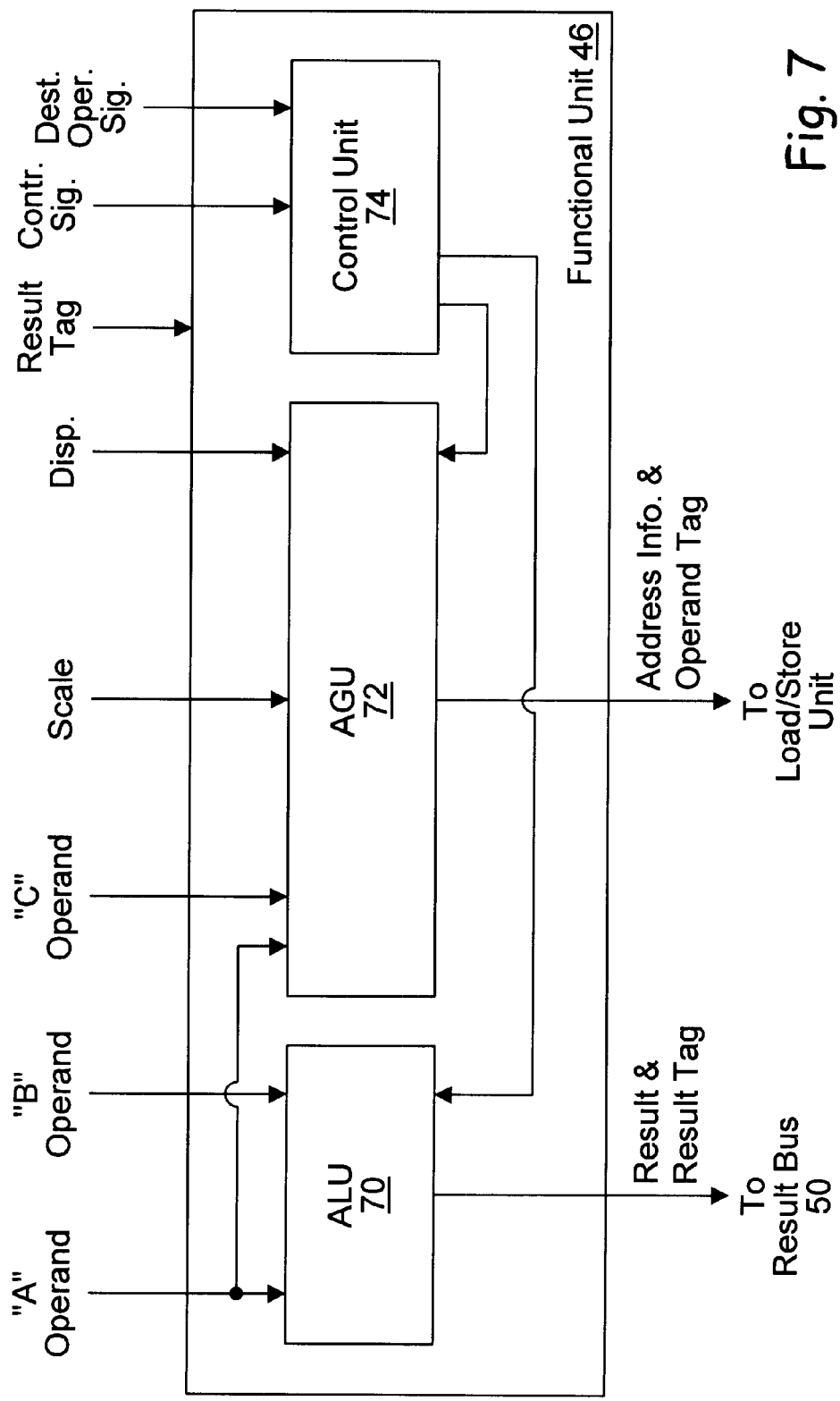
FIG. 7 is a block diagram of one embodiment of the functional unit of FIG. 5.

FIG. 7 is a block diagram of one embodiment of functional unit 46 of FIG. 5. In the embodiment of FIG. 7, functional unit 46 includes an arithmetic logic unit (ALU) 70, an address generation unit (AGU) 72, and a control unit 74. Control unit 74 receives the control signals provided by reservation station 44 and the destination operand signal. Control unit 74 produces a first set of control signals in response to the received control signals and the destination operand signal, and a second set of control signals in response to the received control signals. Functional unit 46 also receives the result tag and any operand tag for a memory operand provided by reservation station 44.

ALU 70 receives the values of the "A" and "B" operands provided by reservation station 44 and the first set of control signals produced by control unit 74. ALU 70 performs the first operation described above using the "A" operand and/or the "B" operand in response to the first set of control signals. As described above, the first operation may be an arithmetic or logic operation specified by x86 instruction 10. As a product of the first operation, ALU 70 produces a result. ALU 70 drives the result value and the corresponding result tag upon result bus 50 such that the result is made available to reservation station 44, reorder buffer 48, and the load/store unit.

AGU 72 receives the values of the "A" and "C" operands, the SCALE value, and the DISPLACEMENT value provided by reservation station 44 along with the second set of control signals produced by control unit 74. As described above, when x86 instruction 10 employs 32-bit base-relative addressing, x86 instruction 10 includes SIB byte 18. Decode unit 42 may produce base field 34 (BASE) of SIB byte 18 as the "A" operand and index field 32 (INDEX) as the "C" operand. Base field 34 (BASE) specifies which register contains the base value for the address calculation, and index field 32 (INDEX) specifies which register contains the index value for the address calculation. The SCALE value specifies the power of two by which the index value will be multiplied, and the DISPLACEMENT value indicates the displacement value used in the address calculation.

AGU 72 performs the second operation described above in response to the second set of control signals. The second operation preferably includes multiplying the index value by the SCALE value to form a product, and adding the BASE value and the DISPLACEMENT value to the product in order to produce memory operand address information which constitutes a portion of a memory operand address. AGU 72 provides the memory operand address information and the corresponding operand tag directly to the load/store unit.

Figure 8:
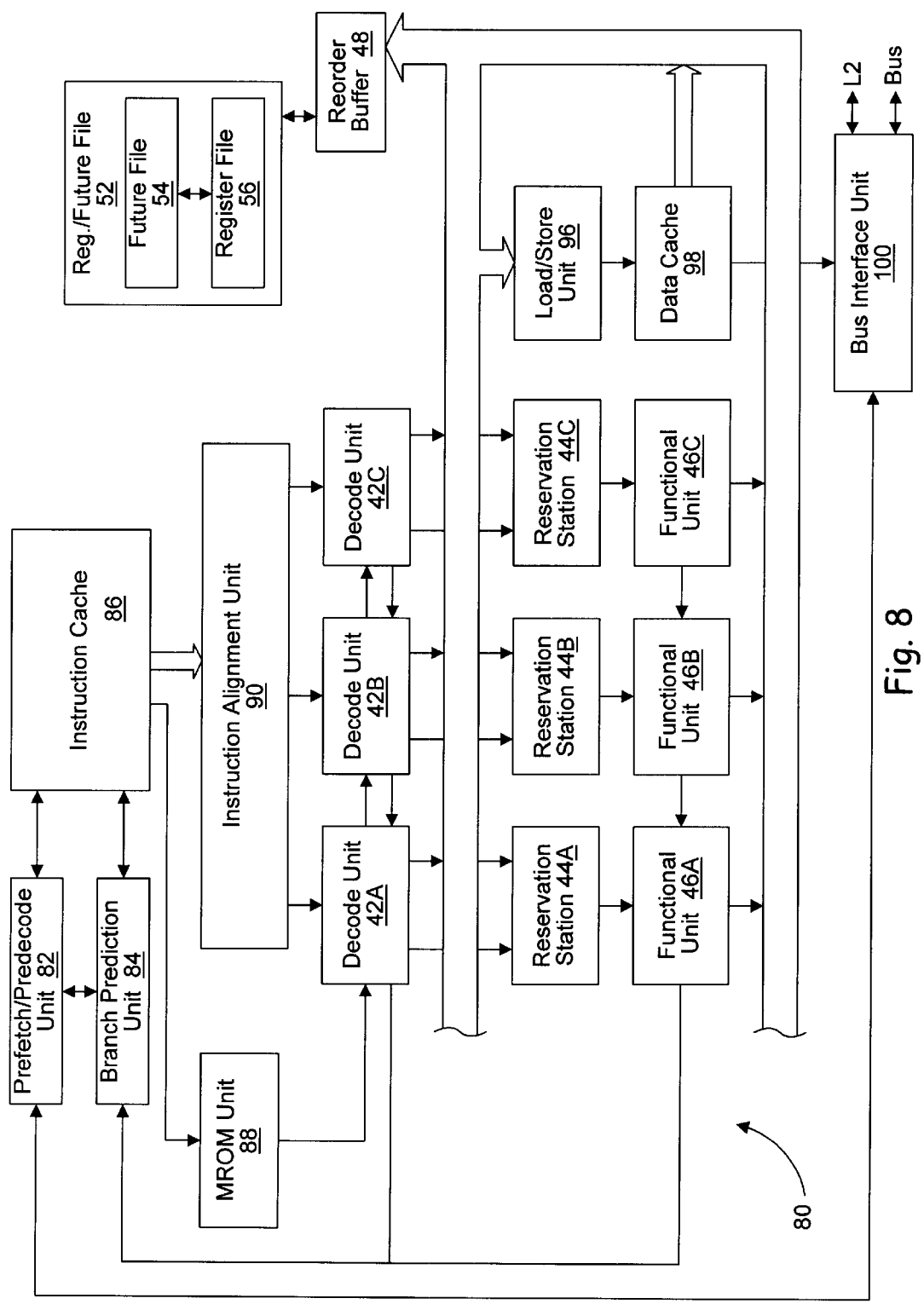
FIG. 8 is a block diagram of one embodiment of a processor including multiple copies of the instruction decode/execution system of FIGS. 5–7.

FIG. 8 is a block diagram of one embodiment of a processor 80 including multiple copies of instruction decode/execution system 42 of FIGS. 5–7. Other embodiments of processor 80 are possible and contemplated. In the embodiment of FIG. 8, processor 80 includes three decode units 42A–42C, three reservation stations 44A–44C, three functional units 46A–46C, and reorder buffer 48. Reservation stations 44A–44C, functional units 46A–46C, and reorder buffer 48 are all coupled to result bus 50 as described above. Processor 80 also includes register/future file 52 coupled to reorder buffer 48, wherein register/future file 52 includes future file 54 and register file 56 as described above. Processor 80 also includes a prefetch/predecode unit 82, a branch prediction unit 84, an instruction cache 86, a microcode read only memory (MROM) unit 88, an instruction alignment unit 90, a load/store unit 96, a data cache 98, a bus interface unit (BTU) 100. Elements referred to herein with a particular reference number followed by a letter will be collectively referred to by the reference number alone. For example, decode units 42A–42C will be collectively referred to as decode units 42.

Processor 80 may execute instructions from a variable byte length instruction set (i.e., an instruction set in which different instructions may occupy differing numbers of bytes). An exemplary variable byte length instruction set is the x86 instruction set.

Prefetch/predecode unit 82 is coupled to BIU 100, instruction cache 86, and branch prediction unit 84. Branch prediction unit 84 is coupled to instruction cache 86, decode units 42, and functional units 46. Instruction cache 86 is further coupled to MROM unit 88 and instruction alignment unit 90. MROM unit 88 is coupled to decode units 42. Instruction alignment unit 90 is in turn coupled to decode units 42. Each decode unit 42A–42C is coupled to load/store unit 96 and to respective reservation stations 44A–44C. Reservation stations 44A–44C are further coupled to respective functional units 46A–46C. Additionally, decode units 42 and reservation stations 44 are coupled to reorder buffer 48 and to register/future file 52. Functional units 46 are coupled to load/store unit 96, register file 64, and reorder buffer 48. Data cache 98 is coupled to load/store unit 96 and BIU 100. BIU 100 is coupled to a level 2 (L2) cache and a bus. A memory may be coupled to the bus, and thus to BIU 100 via the bus.

Prefetch/predecode unit 82 prefetches instructions (i.e., fetches instructions before they are needed) from either the L2 cache or main memory 44 via BIU 100, and stores the prefetched instructions within instruction cache 86. Instruction cache 86 is a high speed cache memory for storing a relatively small number of instructions. Instructions stored within instruction cache 86 are fetched by instruction alignment unit 90 and dispatched to decode units 42. In one embodiment, instruction cache 86 is configured to store up to 64 kilobytes of instructions in a two-way set associative structure having multiple lines with 32 bytes in each line, wherein each byte includes 8 bits. Alternately, any other cache size and/ or configuration may be employed. For example, it is noted that instruction cache 86 may be implemented as a fully associative, set associative, or direct mapped configuration.

Prefetch/predecode unit 82 may employ a variety of prefetch schemes. As prefetch/predecode unit 82 stores prefetched instructions within instruction cache 86, prefetch/predecode unit 82 may generate three predecode bits for each byte of the instructions: a start bit, an end bit, and a functional bit. The predecode bits may form tags indicative of the boundaries of each instruction. The predecode tags may also convey additional information such as whether a given instruction can be decoded directly by decode units 42 or whether the instruction is executed by invoking a microcode procedure controlled by MROM unit 88. Prefetch/predecode unit 82 may be configured to detect branch instructions and to store branch prediction information corresponding to the branch instructions within branch prediction unit 84. Other embodiments may employ any suitable predecode scheme.

In an exemplary predecode encoding of instructions from a variable byte length instruction set, the start bit for a first byte of an instruction is set, and the end bit for a last byte of the instruction is also set. Instructions which may be directly decoded by decode units 42 will be referred to as "fast path" instructions. MROM unit 88 may replace an instruction which cannot be directly decoded by decode units 42 with multiple microcode instructions which accomplish the operation specified by the instruction. Such instructions which cannot be directly decoded by decode units 42 will hereinafter be referred to as "MROM instructions".

For fast path instructions, the functional bit is set for each prefix byte included in the instruction, and is cleared for other bytes. For MROM instructions, the functional bit is cleared for each prefix byte and set for other bytes. Accordingly, if the functional bit corresponding to the end byte is clear, the instruction is a fast path instruction. Conversely, if the functional bit corresponding to the end byte is set, the instruction is an MROM instruction. The opcode of a fast path instruction may thereby be located within ran instruction as the byte associated with the first clear functional bit in the instruction. For example, a fast path instruction including two prefix bytes, a MODR/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a SIB byte is advantageous for MROM unit 88. For such an embodiment, if an instruction includes at least two bytes after the last opcode byte, the functional bit for the MODR/M byte indicates the presence of a SIB byte. If the functional bit for the MODR/M byte is set, then a SIB byte is present. Alternatively, if the functional bit for the MODR/M byte is clear, then a SIB byte is not present.

Processor 80 employs branch prediction in order to speculatively fetch instructions subsequent to conditional branch instructions. Branch prediction unit 84 is included to perform branch prediction operations. In one embodiment, branch prediction unit 84 employs a branch target buffer which stores up to two branch target addresses and corresponding taken/not taken predictions per 16-byte portion of a cache line in instruction cache 86. The branch target buffer may, for example, comprise 2,048 entries or any other suitable number of entries.

Prefetch/predecode unit 82 may determine initial branch targets when instructions of a particular cache line are predecoded. Subsequent updates to the branch targets corresponding to a cache line may occur due to the execution of instructions within the cache line. Instruction cache 86 may provide an indication of the instruction address being fetched, so that branch prediction unit 84 may determine which branch target addresses to select for forming a branch prediction. Decode units 42 and functional units 46 may provide update information to branch prediction unit 84. Decode units 42 may detect branch instructions which were not predicted by branch prediction unit 84. Functional units 46 may execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction.

When a mispredicted branch instruction is detected, instructions subsequent to the mispredicted branch may be discarded from the various units of processor 80. In an alternative configuration, branch prediction unit 84 may be coupled to reorder buffer 48 instead of decode units 42 and functional units 46, and may receive branch misprediction information from reorder buffer 48. A variety of suitable branch prediction algorithms may be employed by branch prediction unit 84.

As instruction alignment unit 90 fetches instructions from instruction cache 86, the corresponding predecode data may be scanned to provide information to instruction alignment unit 90 (and to MROM unit 88) regarding the instructions being fetched. Instruction alignment unit 90 may utilize the scanning data to align an instruction to each of decode units 42. In one embodiment, instruction alignment unit 90 may align instructions from three sets of eight instruction bytes to decode units 42. Decode unit 42A may receive an instruction which is prior to instructions concurrently received by decode units 42B and 42C (in program order). Similarly, decode unit 42B may receive an instruction which is prior to the instruction concurrently received by decode unit 42C in program order.

Decode units 42 are configured to decode instructions received from instruction alignment unit 90. In response to an instruction, a given decode unit 42 produces operand codes, memory operand address information, control signals, and the destination operand signal. The decode unit 42 provides the operand codes and the destination operand signal to reorder buffer 48. In response to the operand codes, reorder buffer 48 provides either operand values, or tags associated with the operand values, to the corresponding reservation station 44. Reorder buffer 48 also provides the decode unit 42 with a result tag associated with the instruction. The destination operand signal identifies the destination operand. If the destination operand is a register, reorder buffer 48 may store the result tag within the storage location reserved for the register within future file 62. If the destination operand is a memory location, reorder buffer 48 may forward a copy of the result tag to load/store unit 96. Each decode unit 42 provides the memory operand address information, the control signals, and the destination operand signal to the corresponding reservation station 44. Reorder buffer 48 provides operand values/tags and the result tag to the corresponding reservation station 44. In one embodiment, each reservation station 44 is capable of holding operand values/tags, memory operand address information, control signals, result tags, and destination operand signals associated with a maximum of 5 decoded instructions awaiting dispatch to corresponding functional units 46.

Processor 80 supports out of order instruction execution. Reorder buffer 48 is used to keep track of the original program sequence for register read and write operations, to implement register renaming, to allow for speculative instruction execution and branch misprediction recovery, and to facilitate precise exceptions. Reorder buffer 48 controls access to future file 54 and register file 56 within register/future file 52. As described above, future file 54 is used to store speculative register states, and register file 56 is used to store non-speculative register states. Additional storage locations may be included within future file 54 and/or register file 56 for use by MROM unit 88.

Reorder buffer 48 may include temporary storage locations for register results to be produced by functional units 46 upon simultaneous dispatch of one or more instructions to decode units 42. As noted above, the x86 register file includes eight 32-bit real registers: EAX, EBX, ECX, EDX, EBP, ESI, EDI, ESP, and sub-registers thereof.

If a branch prediction is incorrect, the results of speculatively-executed instructions along the mispredicted path may be invalidated within reorder buffer 48. Similarly, if a particular instruction causes an exception, results of instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results within reorder file 48 may be discarded.

When register results stored within reorder buffer 48 are no longer speculative, the results may be copied from reorder buffer 48 into register file 56. The storing of non-speculative instruction results into register file 56 and freeing the corresponding storage locations within reorder buffer 48 is referred to as "retiring" the instructions. It is noted that any reorder buffer/storage structure configuration may be employed in various embodiments of processor 80.

In one embodiment, each of the functional units 46 is configured to perform integer arithmetic operations of addition and subtraction, as well as shifts, rotates, logical operations, and branch operations. The operations are performed in response to the control signals decoded for a particular instruction by decode units 42. It is noted that a floating point unit (not shown) may also be employed to accommodate floating point operations. The floating point unit may be operated as a coprocessor, receiving instructions from MROM unit 88 or reorder buffer 48 and subsequently communicating with reorder buffer 48 to complete the instructions. As described above, functional units 46 also perform operand address generation for load and store memory operations performed by load/store unit 96.

Each functional unit 46 may also provide information regarding the execution of conditional branch instructions to the branch prediction unit 84. If a branch prediction was incorrect, branch prediction unit 84 may flush instructions subsequent to the mispredicted branch that have entered the instruction processing pipeline, and initiate the fetching of required instructions from instruction cache 86 or main memory. It is noted that in such situations, results of instructions in the original program sequence which occur after the mispredicted branch instruction may be discarded, including those which were speculatively executed and temporarily stored in load/store unit 96 and future file 54. It is further noted that reorder buffer 48 may indicate branch mispredictions to functional units 46.

As described above, result bus 50 is used to convey results generated by functional units 46 and associated tags identifying the decoded instruction being executed. Results produced by functional units 46 and driven upon result bus 50 may be directed to reorder buffer 48 if a register value is being updated, and to load/store unit 96 if the contents of a memory location are changed.

Load/store unit 96 is coupled to result bus 50, and provides an interface between functional units 46 and data cache 98. In one embodiment, load/store unit 96 is configured with a first load/store buffer having storage locations for data and address information for pending loads or stores which have not accessed data cache 98 and a second load/store buffer having storage locations for data and address information for loads and stores which have access data cache 98. For example, the first buffer may comprise 12 locations and the second buffer may comprise 32 locations. Decode units 42 may arbitrate for access to load/store unit 96. When the first buffer is full, a decode unit may wait until load/store unit 96 has room for the pending load or store request information.

Load/store unit 96 may also perform dependency checking for load memory operations against pending store memory operations to ensure that data coherency is maintained. A memory operation is a transfer of data between processor 80 and the L2 cache, or between processor 80 and a main memory coupled to BIU 100 via the bus. Memory operations may be the result of an instruction which utilizes an operand stored in memory, or may be the result of a load/store instruction which causes the data transfer but no other operation. Additionally, load/store unit 96 may include a special register storage for special registers such as the segment registers and other registers related to the address translation mechanism defined by the x86 processor architecture. As described above, load/store unit 96 may receive memory operand address information from functional units 46 and complete address calculations using segment register information produced by decode units 42.

Data cache 98 is a high speed cache memory provided to temporarily store data being transferred between load/store unit 96 and the L2 cache or main memory 44. In one embodiment, data cache 98 has a capacity of storing up to 64 kilobytes of data in an two-way set associative structure. It is understood that data cache 98 may be implemented in a variety of specific memory configurations, including a set associative configuration, a fully associative configuration, a direct-mapped configuration, and any suitable size of any other configuration.

BIU 100 is coupled to the bus, and is configured to communicate between processor 80 and other components also coupled to the bus via the bus (e.g., a memory external to processor 80). For example, the bus may be compatible with the EV-6 bus developed by Digital Equipment Corporation. Alternatively, any suitable interconnect structure may be used including packet-based, unidirectional or bi-directional links, etc. An optional L2 cache interface may be included within BIU 100 for interfacing to the L2 cache.

Figure 9:
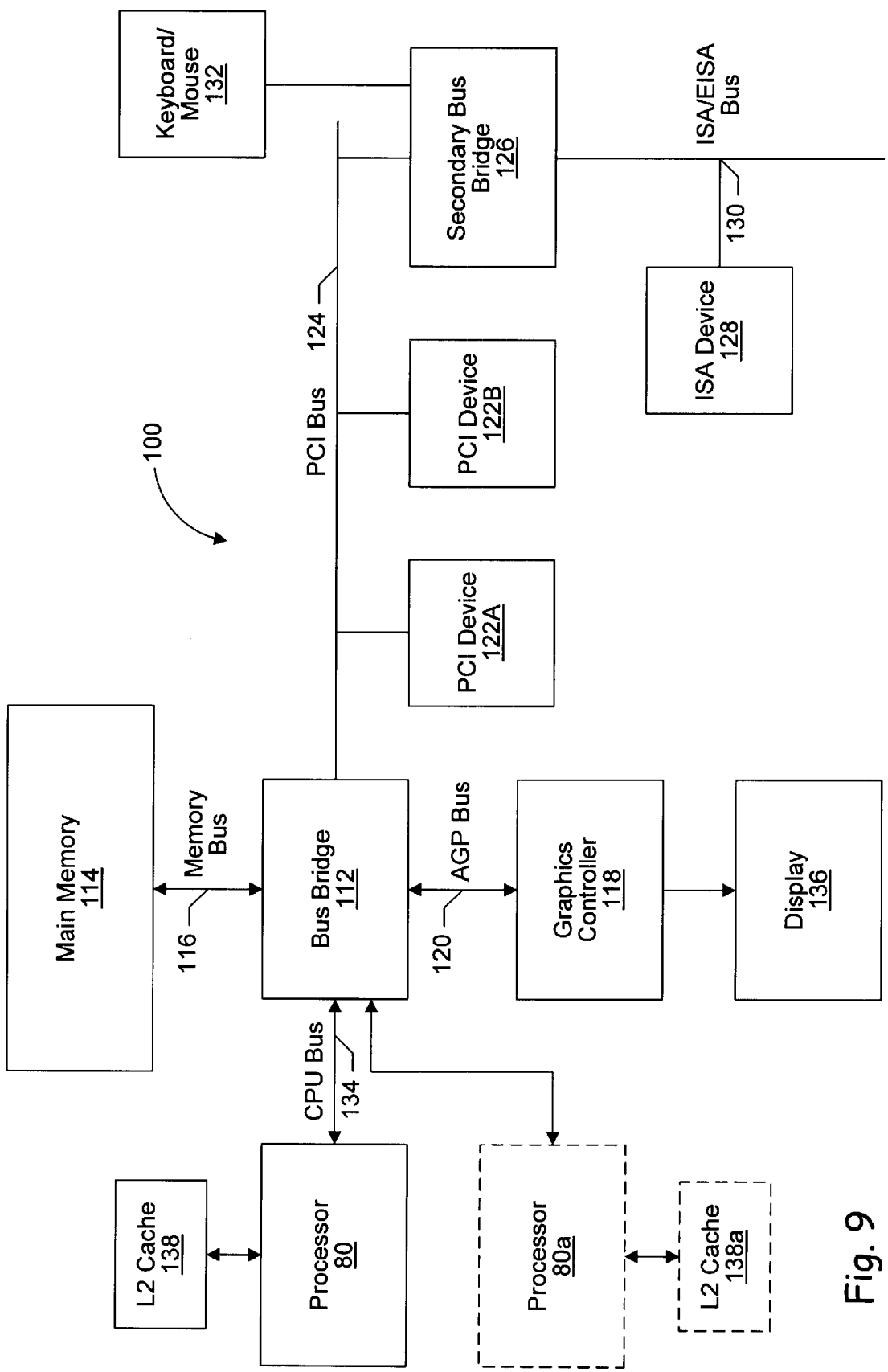
FIG. 9 is a block diagram of one embodiment of a computer system including the processor of FIG. 8.

FIG. 9 is a block diagram of one embodiment of a computer system 110 including processor 80 of FIG. 8. Processor 80 is coupled to a variety of system components through a bus bridge 112. Other embodiments of computer system 110 are possible and contemplated.

In the embodiment of FIG. 9, main memory 114 is coupled to bus bridge 112 through a memory bus 116, and a graphics controller 118 is coupled to bus bridge 112 through an AGP bus 120. Finally, a plurality of PCI devices 122A–122B are coupled to bus bridge 112 through a peripheral component interconnect (PCI) bus 124. A secondary bus bridge 126 may further be provided to accommodate an electrical interface to one or more EISA or ISA devices 128 through an extended industry standard architecture (EISA)/industry standard architecture (ISA) bus 130. Processor 80 is coupled to bus bridge 112 through a CPU bus 132 and to an optional L2 cache 138.

Bus bridge 112 provides an interface between processor 80, main memory 114, graphics controller 118, and devices attached to PCI bus 124. When an operation is received from one of the devices connected to bus bridge 112, bus bridge 112 identifies the target of the operation (e.g. a particular device or, in the case of PCI bus 124, that the target is on PCI bus 124). Bus bridge 112 routes the operation to the targeted device. Bus bridge 112 generally translates an operation from the protocol used by the source device or bus to the protocol used by the target device or bus.

In addition to providing an interface to an ISA/EISA bus for PCI bus 124, secondary bus bridge 126 may further incorporate additional functionality, as desired. An input/output controller (not shown), either external from or integrated with secondary bus bridge 126, may also be included within computer system 110 to provide operational support for a keyboard and mouse 132 and for various serial and parallel ports, as desired. An external cache unit (not shown) may further be coupled to CPU bus 134 between processor 80 and bus bridge 112 in other embodiments. Alternatively, the external cache may be coupled to bus bridge 112 and cache control logic for the external cache may be integrated into bus bridge 112. L2 cache 138 is further shown in a backside configuration to processor 80. It is noted that L2 cache 138 may be separate from processor 80, integrated into a cartridge (e.g. slot 1 or slot A) with processor 80, or integrated onto a semiconductor substrate with processor 80.

Main memory 114 is used to store software instructions and data as described above. A suitable main memory 114 comprises dynamic random access memory (DRAM). For example, a plurality of banks of synchronous DRAM (SDRAM) or Rambus DRAM (RDRAM) may be suitable.

PCI devices 122A–122B are illustrative of a variety of peripheral devices such as, for example, network interface cards, video accelerators, audio cards, hard or floppy disk drives or drive controllers, small computer systems interface (SCSI) adapters and telephony cards. Similarly, ISA device 128 is illustrative of various types of peripheral devices, such as a modem, a sound card, and a variety of data acquisition cards such as GPIB or field bus interface cards.

Graphics controller 118 is provided to control the rendering of text and images on a display 136. Graphics controller 118 may embody a typical graphics accelerator generally known in the art to render three-dimensional data structures which can be effectively shifted into and from main memory 114. Graphics controller 118 may therefore be a master of AGP bus 120 in that it can request and receive access to a target interface within bus bridge 112 to thereby obtain access to main memory 114. A dedicated graphics bus accommodates rapid retrieval of data from main memory 114. For certain operations, graphics controller 118 may further be configured to generate PCI protocol transactions on AGP bus 120. The AGP interface of bus bridge 112 may thus include functionality to support both AGP protocol transactions as well as PCI protocol target and initiator transactions. Display 136 is any electronic display upon which an image or text can be presented. A suitable display 136 includes a cathode ray tube ("CRT"), a liquid crystal display ("LCD"), etc.

It is noted that, while the PCI, AGP, and EISA/ISA buses have been used as examples in the above description, any bus architectures may be substituted as desired. It s further noted that computer system 110 may be a multiprocessing computer system including additional processors (e.g. processor 80A shown as an optional component of computer system 110). Processor 80A may be similar to processor 80, or processor 80A may be an identical copy of processor 80. Processor 80A may be connected to bus bridge 112 via an independent bus (as shown in FIG. 9) or may share CPU bus 134 with processor 80. Furthermore, processor 80A may be coupled to an optional L2 cache 138A similar to L2 cache 138.

It is noted that while certain embodiments have been described above as employing the x86 instruction set, any other instruction set architecture in which instructions are encoded to include a source operand and a destination operand information wherein the order of the source and destination operand information within the instruction encodings may vary may employ the above described features.

Numerous variations and modifications will become apparent to those skilled in the art once the above disclosure is fully appreciated. It is intended that the following claims be interpreted to embrace all such variations and modifications.

What is claimed is:

1. An instruction decode unit, comprising:
   circuitry coupled to receive an instruction, wherein the instruction identifies a plurality of operands, and wherein one of the operands is a destination operand; and
   wherein the circuitry is configured to respond to the instruction by producing: (i) operand codes specifying the operands, wherein the operand codes are produced in the order in which the operands are identified within the instruction, and (ii) a destination operand signal identifying which of the operand codes specifies the destination operand.

2. The instruction decode unit as recited in claim 1, wherein the instruction includes operand information which identifies the operands.

3. The instruction decode unit as recited in claim 1, wherein the instruction includes destination operand information which indicates which of the operands is the destination operand.

4. The instruction decode unit as recited in claim 3, wherein the circuitry produces the destination operand signal dependent upon the destination operand information.

5. The instruction decode unit as recited in claim 1, wherein the instruction is selected from an instruction set including instructions having a variable number of bytes.

6. The instruction decode unit as recited in claim 1, wherein the circuitry is further configured to respond to the instruction by producing control signals.

7. The instruction decode unit as recited in claim 1, wherein the circuitry is further configured to respond to the instruction by producing operand address information.

8. An instruction decode unit, comprising:
   circuitry coupled to receive an instruction, wherein the instruction identifies a plurality of operands, and wherein one of the operands is a destination operand; and
   wherein the circuitry is configured to respond to the instruction by producing: (i) operand codes specifying the operands, wherein the operand codes are produced in the order in which the operands are identified within the instruction, and (ii) a destination operand signal identifying the destination operand, and wherein the instruction is an x86 instruction including operand information which identifies two operands, and wherein the value of a direction bit within the instruction indicates which of the two operands is the destination operand, and wherein the circuitry produces the destination operand signal dependent upon the value of the direction bit.

9. A processor, comprising:
   a decode unit coupled to receive an instruction, wherein the instruction identifies a plurality of operands, and wherein one of the operands is a destination operand, and wherein the decode unit is configured to produce operand codes specifying the operands and a destination operand signal in response to the instruction, and wherein the decode unit produces the operand codes in the order in which the operands are identified within the instruction, and wherein the destination operand signal identifies which of the operand codes specifies the destination operand.

10. The processor as recited in claim 9, wherein the instruction includes: (i) operand information which identifies the operands, and (ii) destination operand information which indicates which of the operands is the destination operand.

11. The instruction decode unit as recited in claim 10, wherein the decode unit is configured to produce the destination operand signal dependent upon the destination operand information.

12. A processor, comprising:
 a decode unit coupled to receive an instruction, wherein the instruction identifies a plurality of operands, and wherein one of the operands is a destination operand, and wherein the decode unit is configured to produce operand codes specifying the operands and a destination operand signal in response to the instruction, and wherein the decode unit produces the operand codes in the order in which the operands are identified within the instruction, and wherein the destination operand signal identifies the destination operand;
 a reservation station coupled to receive: (i) the destination operand signal from the decode unit, and (ii) operands specified by the operand codes, and wherein the reservation station is configured to store and to subsequently provide the operands and the destination operand signal.

13. The processor as recited in claim 12, further comprising a functional unit coupled to receive the operands and the destination operand signal from the reservation station and configured to perform a first operation upon a portion of the operands.

14. A computer system, comprising:
 a processor for executing instructions, including:
  a decode unit coupled to receive an instruction, wherein the instruction identifies a plurality of operands, and wherein one of the operands is a destination operand, and wherein the decode unit is configured to produce operand codes specifying the operands and a destination operand signal in response to the instruction, and wherein the decode unit produces the operand codes in the order in which the operands are identified within the instruction, and wherein the destination operand signal identifies which of the operand codes specifies the destination operand.

15. The computer system as recited in claim 14, further comprising:
 a bus coupled to the processor, and
 a peripheral device coupled to the bus.

16. The computer system as recited in claim 15, wherein the bus is a peripheral component interconnect (PCI) bus, and wherein the peripheral device is selected from the group consisting of: a network interface card, a video accelerator, an audio card, a hard disk drive, and a floppy disk drive.

17. The computer system as recited in claim 15, wherein the bus is an extended industry standard architecture (EISA)/industry standard architecture (ISA) bus, and wherein the peripheral device is selected from the group consisting of: a modem, a sound card, and a data acquisition card.

18. A processor comprising:
 a decode unit coupled to receive an instruction, wherein the decode unit is configured to generate a plurality of operand specifiers corresponding to operands of the instruction, wherein the decode unit is configured to generate the plurality of operand specifiers in an order specified in the instruction; and
 a functional unit comprising:
  an arithmetic/logic unit coupled to receive a first predefined subset of the operands to perform an arithmetic/logic operation on the predefined subset of the plurality of operands; and
  an address generation unit coupled to receive a second predefined subset of the operands to perform an address generation, the second predefined subset different from the first predefined subset.

19. The processor as recited in claim 18 wherein at least one of the plurality of operands is in both the first predefined subset and the second predefined subset.

20. The processor as recited in claim 18 further comprising a reservation station coupled to receive a plurality of operands corresponding to the plurality of operand specifiers, and wherein the reservation station is coupled to supply the plurality of operands to the functional unit.

21. The processor as recited in claim 18 wherein the decode unit is further configured to generate an indication of which of the plurality of operand specifiers specifies the destination operand of the instruction.

* * * * *